United States Patent
Cohen et al.

(10) Patent No.: US 8,987,984 B2
(45) Date of Patent: Mar. 24, 2015

(54) FLUORESCENT LAMP INCLUDING PHOSPHOR COMPOSITION WITH SPECIAL BAMN PHOSPHOR, (BA,SR,CA)(MG1-X MNX)AL10O17:EU2+

(71) Applicant: General Electric Company, Schenectady, NY (US)

(72) Inventors: William Erwin Cohen, Cleveland, OH (US); Fangming Du, Northfield, OH (US); William Beers, Cleveland, OH (US); Jon Bennett Jansma, Cleveland, OH (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 13/655,894

(22) Filed: Oct. 19, 2012

(65) Prior Publication Data
US 2014/0111082 A1    Apr. 24, 2014

(51) Int. Cl.
*H01J 9/00*  (2006.01)
*H01J 1/62*  (2006.01)
*C09K 11/76* (2006.01)

(52) U.S. Cl.
CPC ..................................... *C09K 11/76* (2013.01)
USPC ............... 313/487; 313/503; 252/301.4 R; 252/301.4 S; 252/301.6 P; 252/301.4 P

(58) Field of Classification Search
CPC ........................... C09K 11/76; C09K 11/7734
USPC ............. 313/487, 503; 252/301.4 S, 301.4 P, 252/301.6 P, 301.4 R
See application file for complete search history.

(56) References Cited

U.S. PATENT DOCUMENTS

| | | | |
|---|---|---|---|
| 2,279,635 A | 4/1942 | Morley |
| 3,764,844 A | 10/1973 | Schmidt |
| 3,899,712 A | 8/1975 | Witting |

(Continued)

FOREIGN PATENT DOCUMENTS

| | | |
|---|---|---|
| DE | 4133077 | 4/1993 |
| GB | 2405409 | 3/2005 |

(Continued)

OTHER PUBLICATIONS

International Commission on Illumination, Method of Measuring and Specifying Colour Rendering Properties of Light Sources, 2nd Edition, Publication CIE No. 13.2 (TC-3.2), 1974, France.

(Continued)

*Primary Examiner* — Elmito Breval
(74) *Attorney, Agent, or Firm* — Pearne & Gordon LLP

(57) ABSTRACT

A fluorescent lamp includes a phosphor composition comprising: $Y_2O_3:Eu^{3+}$ (YEO); at least one of $LaPO_4:Ce^{3+}, Tb^{3+}$ (LAP), $MgAl_{11}O_{19}:Ce^{3+}, Tb^{3+}$ (CAT) or $GdMgB_5O_{10}:Ce^{3+}, Tb^{3+}$ (CBT); a special BAMn phosphor, $(Ba,Sr,Ca)(Mg_{1-x}Mn_x)Al_{10}O_{17}:Eu^{2+}$, with a specific amount of Mn (x) as disclosed herein, and optionally halophosphor, with the proviso that there is no $BaMgAl_{10}O_{17}:Eu^{2+}$ (BAM).

13 Claims, 1 Drawing Sheet

(56) References Cited

U.S. PATENT DOCUMENTS

| | | | |
|---|---|---|---|
| 4,503,360 A | 3/1985 | Bedel | |
| 5,128,590 A | 7/1992 | Holzer | |
| 5,243,256 A | 9/1993 | Holzer | |
| 5,451,104 A | 9/1995 | Kleen et al. | |
| 5,854,533 A | 12/1998 | Pappalardo | |
| 6,222,312 B1 | 4/2001 | Ghosh et al. | |
| 6,414,426 B1 | 7/2002 | Akashi et al. | |
| 6,459,197 B1 | 10/2002 | Mori et al. | |
| 7,391,148 B1 | 6/2008 | Setlur et al. | |
| 2004/0113538 A1* | 6/2004 | Srivastava et al. | 313/486 |
| 2005/0179358 A1* | 8/2005 | Soules et al. | 313/487 |
| 2008/0265207 A1 | 10/2008 | Konrad et al. | |
| 2009/0194740 A1 | 8/2009 | Heo et al. | |
| 2010/0096998 A1 | 4/2010 | Beers | |
| 2011/0037378 A1 | 2/2011 | Yagi et al. | |
| 2012/0126685 A1 | 5/2012 | Toth et al. | |

FOREIGN PATENT DOCUMENTS

| | | |
|---|---|---|
| JP | 2000109826 A | 4/2000 |
| JP | 2001303047 A | 10/2001 |

OTHER PUBLICATIONS

U.S. Appl. No. 13/192,017, filed Jul. 27, 2011 entitled Fluorescent Lamps Having High CRI and LPW, Inventor Fangming Du, et al.

U.S. Appl. No. 13/305,860, filed Nov. 29, 2011 entitled Fluorescent Lamp Having High CRI, Inventor Fangming Du, et al.

European Search Report and Opinion dated Jun. 2, 2014 for European Application No. 13188469.4-1355/2722379.

Guifang Ju et al: "Photoluminescence properties of color-tunable SrMgAlO:Eu.Mnphosphors for UV LEDs". Journal of Luminescence. Elsevier BV North-Holland, NL, vol. 132., No. 7, Feb. 17, 2012. pp. 1792-1797. XP028473943.

* cited by examiner

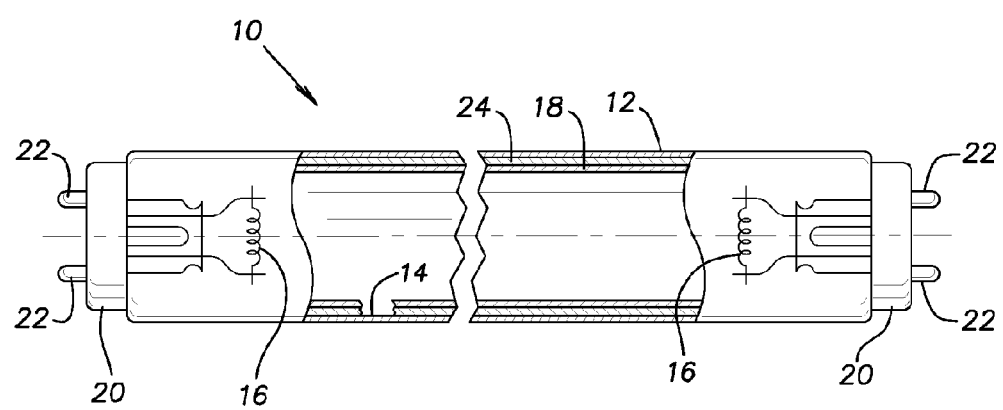

FLUORESCENT LAMP INCLUDING PHOSPHOR COMPOSITION WITH SPECIAL BAMN PHOSPHOR, (BA,SR,CA)(MG1-X MNX)AL10O17:EU2+

TECHNICAL BACKGROUND

The present disclosure relates to phosphor compositions, particularly phosphors for use in fluorescent lamps. More particularly, the present disclosure relates to phosphor compositions that can produce white light and include a special BAMn phosphor, $(Ba,Sr,Ca)(Mg_{1-x}Mn_x)Al_{10}O_{17}:Eu^{2+}$, where x is defined below, without using BAM phosphor, $BaMgAl_{10}O_{17}:Eu^{2+}$.

Fluorescent lamps typically have a transparent glass envelope enclosing a sealed discharge space containing an inert gas and mercury vapor. When subjected to a current provided by electrodes, the mercury ionizes to produce radiation having primary UV wavelengths of 185 nm and 254 nm. This ultraviolet radiation, in turn, excites phosphors on the inside surface of the envelope to produce visible light which is emitted through the glass.

Generally, a fluorescent lamp for illumination uses a phosphor which absorbs the 254 nm Hg-resonance emission wavelength and is activated so as to convert the ultraviolet luminescence of mercury vapor into visible light. In order to improve the color-rendering properties and emission output of fluorescent lamps, a three-band type fluorescent lamp, which employs a mixture of red, green and blue-emitting phosphors, has been used to render illumination of a white color. For example, the phosphor may include a mixture of europium-activated barium magnesium aluminate phosphor $(BaMgAl_{10}O_{17}:Eu^{2+})$ for the blue-emitting phosphor, cerium- and terbium-coactivated lanthanum phosphate phosphor $(LaPO_4:Ce^{3+}, Tb^{3+})$ for the green-emitting phosphor, and europium-activated yttrium oxide phosphor $(Y_2O_3:Eu^{3+})$ for the red-emitting phosphor, mixed in an adequate ratio. The combined spectral output of such a phosphor blend produces a white light.

The apparent color of a light source is described in terms of color temperature, which is the temperature of a black body that emits radiation of about the same chromaticity as the radiation considered. A light source having a color temperature of 3000 Kelvin has a larger red component than a light source having a color temperature of 4100 Kelvin. The color temperature of a lamp using a phosphor blend can be varied by changing the ratio and composition of the phosphors.

Color quality is further described in terms of color rendering, and more particularly color rendering index (CRI or $R_a$), which is a measure of the degree to which the psycho-physical colors of objects illuminated by a light source conform to those of a reference illuminant for specified conditions. CRI is in effect a measure of how well the spectral distribution of a light source compares with that of an incandescent (blackbody) source, which has a Planckian distribution between the infrared (over 700 nm) and the ultraviolet (under 400 nm). The discrete spectra which characterize phosphor blends will yield good color rendering of objects whose colors match the spectral peaks, but not as good of objects whose colors lie between the spectral peaks.

Color rendition is a measure of the light reflected by a color sample under a given light source, compared to the light reflected by the same sample under a standard light source. Color rendition is calculated as disclosed in "Method of Measuring and Specifying Colour Rendering Properties of Light Sources, 2nd Edition", International Commission on Illumination, Publication CIE No. 13.2 (TC-3.2) 1974, the contents of which are hereby incorporated by reference. The differences in value, chroma and hue of the light reflected under the two sources are measured and summed, the square root of the sum is taken, multiplied by a constant, and subtracted from 100. This calculation is done for 14 different color standards. The color rendering index for each of these standards is designated $R_i$. The General Color Rendering Index, $R_a$, is defined as the average of the first eight indices, $R_1$-$R_8$. The constant has been chosen such that $R_a$ for a standard warm white fluorescent tube is approximately 50. It should be noted that an $R_a$ of 100 corresponds to a light source under which the color samples appear exactly as they would under a standard light source, such as an incandescent (black body) lamp or natural daylight.

The color appearance of a lamp is described by its chromaticity coordinates which can be calculated from the spectral power distribution according to standard methods. See CIE, Method of measuring and specifying color rendering properties of light sources (2nd ed.), Publ. CIE No. 13.2 (TC-3, 2), Bureau Central de la CIE, Paris, 1974. The CIE standard chromaticity diagram includes the color points of black body radiators at various temperatures. The locus of black body chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color.

Another parameter with regard to light emission is luminous efficacy of a source of light is the quotient of the total luminous flux emitted by the total lamp power input as expressed in lumens per watt (LPW or lm/W).

Spectral blending studies have shown that the LPW and CRI of white light sources are dependent upon the spectral distribution of the individual color phosphors. It is expected that such phosphors will remain stable during extended lamp operation such that the phosphors remain chemically stable over a period of time while maintaining stable CIE color coordinates of the lamp. The human eye does not have the same sensitivity to all visible light wavelengths. Rather, light with the same intensity but different wavelengths will be perceived as having different luminosity.

BRIEF DESCRIPTION OF THE DISCLOSURE

The phosphor composition of this disclosure comprises, or may consist essentially of: YEO; at least one of LAP, CAT and CBT; a special BAMn phosphor with a specific range of Mn disclosed below, and optionally halophosphor. Excluded from the phosphor composition is $BaMgAl_{10}O_{17}:Eu^{2+}$ (BAM) (emitting blue light with a peak wavelength of 450 nm). $Y_2O_3:Eu^{3+}$ (YEO) emits red-orange light with a peak wavelength of 611 nm. $LaPO_4:Ce^{3+}, Tb^{3+}$ (LAP) emits green light with a peak wavelength of 544 nm. $MgAl_{11}O_{19}:Ce^{3+}, Tb^{3+}$ (CAT) emits green light with a peak wavelength of 543 nm. $GdMgB_5O_{10}:Ce^{3+}, Tb^{3+}$ (CBT) emits green light with a peak wavelength of 545 nm. A primary component of the phosphor composition is the special BAMn phosphor, $(Ba,Sr,Ca)(Mg_{1-x}Mn_x)Al_{10}O_{17}:Eu^{2+}$, with specific ranges of x (amounts of Mn) as described in this disclosure below depending on the other components of the phosphor composition and desired CIE chromaticity coordinates. Typical $BaMgAl_{10}O_{17}:Eu^{2+}, Mn^{2+}$ (BAMn) emits blue-green light with a peak wavelength of 450/515 nm. However, the amounts of Mn used in the special BAMn of this disclosure are much less than the amount of Mn used in typical BAMn in which it can range from 0.35-0.40, for example. The halophosphor used herein has the general formula, $(Ca,Ba,Sr)_5(PO_4)_3(F,Cl):Sb^{3+}, Mn^{2+}$; for example, $Ca_5(PO_4)_3(F,Cl):Sb^{3+}, Mn^{2+}$ (calcium halophosphate), may be used in the phosphor composition. The amounts and types of each phosphor in the phosphor composition can be selected to produce the desired CCT of the lamp (3000° K to 6500° K) and specific CIE chromaticity coordinates (ccx, ccy) as would be understood by one of ordinary skill in the art in view of this disclosure. As is known in the art, the fluorescent lamp includes a sealed glass envelope that contains a discharge sustaining fill (e.g., mercury or a mercury substitute and an inert gas) and means for creating the discharge (e.g., electrodes) disposed in the envelope.

One aspect of this disclosure features a fluorescent lamp including a phosphor composition comprising:

$Y_2O_3:Eu^{3+}$ (YEO);

$LaPO_4:Ce^{3+}, Tb^{3+}$ (LAP), $MgAl_{11}O_{19}:Ce^{3+}, Tb^{3+}$ (CAT) or $GdMgB_5O_{10}:Ce^{3+}, Tb^{3+}$ (CBT); and $(Ba,Sr,Ca)(Mg_{1-x}Mn_x)Al_{10}O_{17}:Eu^{2+}$ (BAMn) where x ranges from 0.026-0.049, wherein CRI of the lamp is at least 87 across all color temperatures.

More specifically, x can range from 0.030-0.045. Excluded from the phosphor composition is $BaMgAl_{10}O_{17}:Eu^{2+}$ (BAM).

A second aspect of this disclosure features a fluorescent lamp including a phosphor composition comprising:

$Y_2O_3:Eu^{3+}$ (YEO);

$LaPO_4:Ce^{3+}, Tb^{3+}$ (LAP), $MgAl_{11}O_{19}:Ce^{3+}, Tb^{3+}$ (CAT) or $GdMgB_5O_{10}:Ce^{3+}, Tb^{3+}$ (CBT); and $(Ca,Ba,Sr)_5(PO_4)_3(F,Cl):Sb^{3+}, Mn^{2+}$ (Halophosphor); and $(Ba,Sr,Ca)(Mg_{1-x}Mn_x)Al_{10}O_{17}:Eu^{2+}$ (BAMn) where x is selected from the following group of ranges consisting of:

x ranges from 0.102-0.154 when chromaticity coordinates ccx, ccy are within a four step oval centered at ccx=0.440, ccy=0.403;

x ranges from 0.090-0.134 when chromaticity coordinates ccx, ccy are within a four step oval centered at ccx=0.413, ccy=0.393;

x ranges from 0.078-0.116 when chromaticity coordinates ccx, ccy are within a four step oval centered at ccx=0.380, ccy=0.380;

x ranges from 0.074-0.110 when chromaticity coordinates ccx, ccy are within a four step oval centered at ccx=0.346, ccy=0.359;

x ranges from 0.060-0.090 when chromaticity coordinates ccx, ccy are within a four step oval centered at ccx=0.313, ccy=0.337; and wherein CRI of the lamp is at least 87. Excluded from the phosphor composition is $BaMgAl_{10}O_{17}:Eu^2$ (BAM).

Referring to more specific features of the second aspect of this disclosure, x can range from 0.105-0.150 when the chromaticity coordinates ccx, ccy are within a four step oval centered at ccx=0.440, ccy=0.403. The halophosphor can be warm white halo. In addition, x can range from 0.095-0.130 when the chromaticity coordinates ccx, ccy are within a four step oval centered at ccx=0.413, ccy=0.393. In this event, the halophosphor can be white halo. Still further x can range from 0.085-0.110 when the chromaticity coordinates ccx, ccy are within a four step oval centered at ccx=0.380, ccy=0.380. In this regard, the halophosphor can be cool white halo. Moreover, x can range from 0.082-0.102 when the chromaticity coordinates ccx, ccy are within a four step oval centered at ccx=0.346, ccy=0.359. In this regard the halophosphor can be daylight 1 halo. Finally, x can range from 0.067-0.083 when the chromaticity coordinates ccx, ccy are within a four step oval centered at ccx=0.313, ccy=0.337. In this regard the halophosphor can be daylight 2 halo.

Many additional features, advantages and a fuller understanding of the invention will be had from the accompanying drawings and the Detailed Description of the Disclosure that follows. It should be understood that the above Brief Description of the Disclosure describes the invention in broad terms while the following Detailed Description of the Disclosure describes the invention more narrowly and presents embodiments that should not be construed as necessary limitations of the broad invention as defined in the claims.

DETAILED DESCRIPTION OF THE DISCLOSURE

Figure 1:
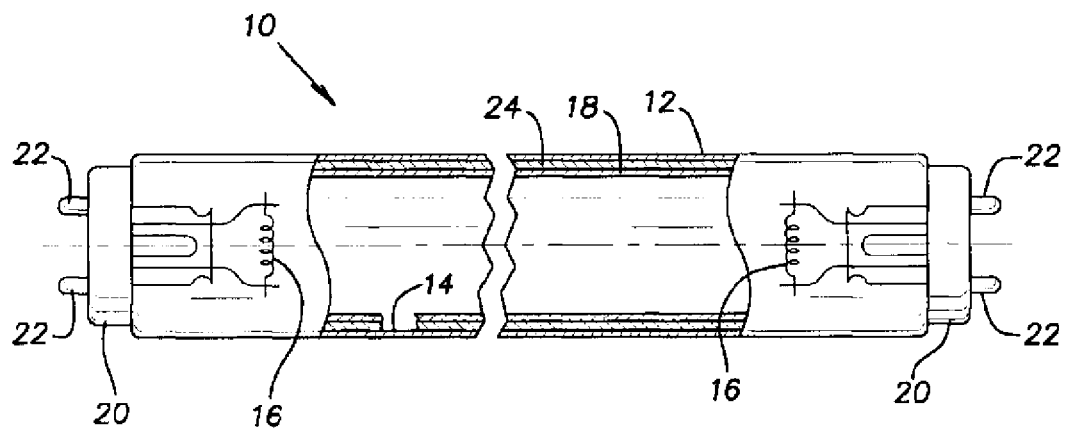
FIG. 1 shows a partial cross-sectional side view of a fluorescent lamp coated with a phosphor composition of this disclosure.

The fluorescent lamp 10 has a light-transmissive glass tube or envelope 12 which has a circular cross-section. The inner surface 14 of the glass envelope is provided with a phosphor-containing layer 18. A barrier layer 24 may be disposed between the inner surface 14 and phosphor-containing layer 18 as known in the art. The barrier layer is typically alumina but can be other materials that are reflective to UV and preferably inert with respect to mercury, for example yttria. The lamp is hermetically sealed by bases 20 attached at both ends, and a pair of spaced electrode structures 16 at each end of the lamp (which are means for providing a discharge) are respectively mounted on the bases 20. As will be familiar to those having ordinary skill in the art, the electric current is delivered to the electrode structures through the pins 22 which are held in lamp sockets or holders not shown that are connected to an electric circuit that includes a source of electric power. A discharge-sustaining fill of mercury or a mercury substitute and an inert gas is sealed inside the glass tube. The inert gas is typically argon or a mixture of argon and other noble gases at low pressure which, in combination with a small quantity of mercury, provide the low vapor pressure manner of operation.

The phosphor-containing layer 18 is preferably utilized in a low pressure mercury vapor discharge lamp, but may also be used in a high pressure mercury vapor discharge lamp. As used herein, a "fluorescent lamp" is any mercury vapor discharge fluorescent lamp as known in the art, including fluorescent lamps having electrodes, and electrodeless fluorescent lamps where the means for providing a discharge include a radio transmitter adapted to excite mercury vapor atoms via transmission of an electromagnetic signal. A "T8 lamp" can be used in this disclosure and is a fluorescent lamp as known in the art, e.g., linear, nominally 48 inches in length, and having a nominal outer diameter of 1 inch (eight times ⅛ inch, which is where the "8" in "T8" comes from). The T8 fluorescent lamp can also be nominally 2, 3, 6 or 8 feet long, or some other length. T5 and T12 fluorescent lamps known in the art can also utilize the coated phosphors of this disclosure. The fluorescent lamp can have a "non-straight glass envelope" which includes (but is not limited to) a glass envelope or tube which is in the shape of an L or a U (such as a 4 foot T8 or T12 lamp bent into a U-shape), a circular glass envelope as is known in the art, the glass envelope of a compact fluorescent lamp (e.g., a helical compact fluorescent lamp), and other glass envelopes which are not a straight cylindrical glass envelope. Compact fluorescent lamps are well known and applicable here; see U.S. Pat. Nos. 2,279,635; 3,764,844; 3,899,712; 4,503,360; 5,128,590; 5,243,256; 5,451,104; and German Patent Application No. DE 4133077 filed in Germany on Oct. 2, 1991.

In the coating procedure, typically the various phosphor powders are blended by weight. The resulting powder is then dispersed in a water based system (which may contain other additives as are known in the art, including adherence promoters such as fine non-luminescent particles of alumina or calcium pyrophosphate) optionally with a dispersing agent as is known in the art. A thickener may be added, typically polyethylene oxide. The dispersion is then typically diluted with deionized water until it is suitable for producing a coating of the desired thickness or coating weight. The phosphor blend coating is then applied to the inside of the glass tube, i.e. preferably by pouring the coating down the inside of a vertically-held tube or pumping the coating up into the tube, and heated by forced air until dry, as is known in the art. After the first thin coating or layer is applied, additionally desired thin coatings or layers may be applied in the same manner, carefully drying each coat before the next coat is applied. The thin layers, deposited in accord with known techniques, are built up until the total or cumulative coating thickness is sufficient to absorb substantially all of the UV light produced by the arc. This will typically be a phosphor layer of from about 3-7 particles thick. Although not intended to be limiting, this typically corresponds to a thickness of between about 3 and about 50 microns, preferably between 10 and 30 microns, depending on the exact composition of the phosphor blend and the particle size of the phosphors.

The following phosphor compositions (with halophosphor-Table 1 and without halophosphor-Table 2) are suitable for use in fluorescent lamps at the indicated color temperatures using the following weight fractions (WF) of components. The halophosphors referred to in these tables can be obtained commercially using the specified names in the tables (e.g., "warm white halo," "cool white halo"). A specific amount of manganese (Mn), x, in the special BAMn ((Ba,Sr,Ca)(Mg$_{1-x}$Mn$_x$)Al$_{10}$O$_{17}$:Eu$^{2+}$) of this disclosure is indicated for each phosphor composition along with a suitable Mn range. The amounts of Eu and Ba in each sample is 0.1 and 0.9, respectively.

TABLE 1

WITHOUT Halophosphor

| 3000 K | WF | 3500 K | WF | 4100 K | WF |
|---|---|---|---|---|---|
| YEO | 0.62 | YEO | 0.57 | YEO | 0.51 |
| LAP/CAT | 0.34 | LAP/CAT | 0.345 | LAP/CAT | 0.335 |
| BAMn | 0.04 | BAMn | 0.085 | BAMn | 0.155 |
| Mn = | 0.041 | Mn = | 0.036 | Mn = | 0.039 |
| Mn range = | 0.035-0.045 | Mn range = | 0.03-0.04 | Mn range = | 0.035-0.045 |

| 5000 K | WF | 6500 K | WF |
|---|---|---|---|
| YEO | 0.44 | YEO | 0.39 |
| LAP/CAT | 0.32 | LAP/CAT | 0.278 |
| BAMn | 0.24 | BAMn | 0.332 |
| Mn = | 0.033 | Mn = | 0.035 |
| Mn range = | 0.03-0.04 | Mn range = | 0.03-0.04 |

TABLE 2

WITH Halophosphor

| 3000 K | WF | 3500 K | WF | 4100 K | WF |
|---|---|---|---|---|---|
| YEO | 0.46 | YEO | 0.395 | YEO | 0.335 |
| LAP/CAT | 0.10 | LAP/CAT | 0.065 | LAP/CAT | 0.02 |
| BAMn | 0.10 | BAMn | 0.115 | BAMn | 0.155 |
| Warm White Halo | 0.34 | White Halo | 0.425 | Cool White Halo | 0.49 |
| Mn = | 0.128 | Mn = | 0.112 | Mn = | 0.097 |
| Mn range = | 0.105-0.15 | Mn range = | 0.095-0.130 | Mn range = | 0.085-0.11 |

| 5000 K | WF | 6500 K | WF |
|---|---|---|---|
| YEO | 0.265 | YEO | 0.22 |
| LAP/CAT | 0.0 | LAP/CAT | 0.0 |
| BAMn | 0.15 | BAMn | 0.15 |
| Daylight1 Halo | 0.585 | Daylight2 Halo | 0.63 |
| Mn = | 0.092 | Mn = | 0.075 |
| Mn range = | 0.082-0.102 | Mn range = | 0.067-0.083 |

The CIE chromaticity coordinates for each of the color temperatures referred to in Tables 1 and 2 above are given in Table 3 below.

TABLE 3

| Color temperature | ccx | ccy |
|---|---|---|
| 3000 K | 0.440 | 0.403 |
| 3500 K | 0.413 | 0.393 |
| 4100 K | 0.380 | 0.380 |
| 5000 K | 0.346 | 0.359 |
| 6500 K | 0.313 | 0.337 |

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

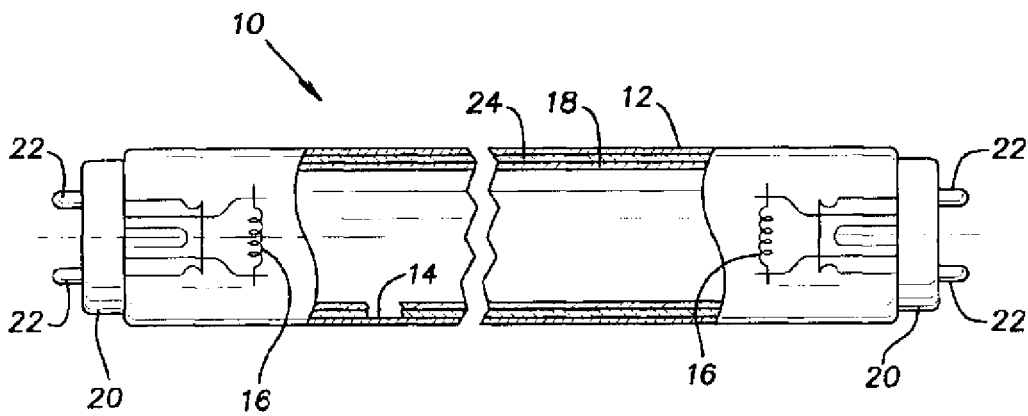

What is claimed is:

1. A fluorescent lamp including a phosphor composition comprising Y$_2$O$_3$:Eu$^{3+}$ (YEO); LaPO$_4$:Ce$^{3+}$, Tb$^{3+}$ (LAP), MgAl$_{11}$O$_{19}$:Ce$^{3+}$, Tb$^{3+}$ (CAT) or GdMgB$_5$O$_{10}$:Ce$^{3+}$, Tb$^{3+}$ (CBT); and (Ba,Ca)(Mg$_{1-x}$Mn$_x$)Al$_{10}$O$_{17}$:Eu$^{2+}$ where x ranges from 0.026-0.049, with the proviso that there is no BaMgAl$_{10}$O$_{17}$:Eu$^{2+}$ (BAM);
wherein CRI of the lamp is at least 87 across all color temperatures.

2. The fluorescent lamp of claim 1 wherein x ranges from 0.030-0.045.

3. A fluorescent lamp including a phosphor composition comprising: Y$_2$O$_3$:Eu$^{3+}$ (YEO); LaPO$_4$:Ce$^{3+}$, Tb$^{3+}$ (LAP), MgAl$_{11}$O$_{19}$:Ce$^{3+}$, Tb$^{3+}$ (CAT) or GdMgB$_5$O$_{10}$:Ce$^{3+}$, Tb$^{3+}$ (CBT); Halophosphor; and (Ba,Ca)(Mg$_{1-x}$Mnx)Al$_{10}$O$_{17}$:Eu$^{2+}$ with the proviso that there is no BaMgAl$_{10}$O$_{17}$:Eu2+ (BAM); and wherein CRI of the lamp is at least 87, and where x is selected from the following group ranges consisting of:
 (1), x ranges from 0.102-0.154 when chromaticity coordinates ccx, ccy are within a four step oval centered at ccx=0.440, ccy=0.403;
 (2), x ranges from 0.090-0.134 when chromaticity coordinates ccx, ccy are within a four step oval centered at ccx=0.413, ccy=0.393;

(3), x ranges from 0.078-0.116 when chromaticity coordinates ccx, ccy are within a four step oval centered at ccx=0.380, ccy=0.380;

(4), x ranges from 0.074-0.110 when chromaticity coordinates ccx, ccy are within a four step oval centered at ccx=0.346, ccy=0.359; and (5), x ranges from 0.060-0.090 when chromaticity coordinates ccx, ccy are within a four step oval centered at ccx=0.313, ccy=0.337.

4. The fluorescent lamp of claim 3 wherein x ranges from 0.105-0.150 when chromaticity coordinates ccx, ccy are within a four step oval centered at ccx=0.440, ccy=0.403.

5. The fluorescent lamp of claim 4 wherein said halophosphor is warm white halo.

6. The fluorescent lamp of claim 3 wherein x ranges from 0.095-0.130 when chromaticity coordinates ccx, ccy are within a four step oval centered at ccx=0.413, ccy=0.393.

7. The fluorescent lamp of claim 6 wherein said halophosphor is white halo.

8. The fluorescent lamp of claim 3 wherein x ranges from 0.085-0.110 when chromaticity coordinates ccx, ccy are within a four step oval centered at ccx=0.380, ccy=0.380.

9. The fluorescent lamp of claim 8 wherein said halophosphor is cool white halo.

10. The fluorescent lamp of claim 3 wherein x ranges from 0.082-0.102 when chromaticity coordinates ccx, ccy are within a four step oval centered at ccx=0.346, ccy=0.359.

11. The fluorescent lamp of claim 10 wherein said halophosphor is daylight 1 halo.

12. The fluorescent lamp of claim 10 wherein said halophosphor is daylight 2 halo.

13. The fluorescent lamp of claim 3 wherein x ranges from 0.067-0.083 when chromaticity coordinates ccx, ccy are within a four step oval centered at ccx=0.313, ccy=0.337.

* * * * *

UNITED STATES PATENT AND TRADEMARK OFFICE
CERTIFICATE OF CORRECTION

PATENT NO. : 8,987,984 B2  Page 1 of 3
APPLICATION NO. : 13/655894
DATED : March 24, 2015
INVENTOR(S) : Cohen et al.

It is certified that error appears in the above-identified patent and that said Letters Patent is hereby corrected as shown below:

On the title page item (72), under "Inventors", in Column 1, Line 3, delete "Cleveland," and insert -- Chesterland, --, therefor.

The title page showing the illustrative figure should be deleted to be replaced with the attached title page.

In the Drawings

Drawing sheet, consisting of Fig. 1, should be deleted to be replaced with the drawing sheet, consisting of Fig. 1, as shown on the attached page.

In the Specification

In Column 3, Line 32, delete "(CBT); and" and insert -- (CBT); --, therefor.

In Column 3, Line 53, please delete "$Eu^2$" and replace it with -- $Eu^{2+}$ --.

In the Claims

In Column 6, Line 58, in Claim 3, delete "$(Mg_{1-x}Mnx)$" and insert -- $(Mg_{1-x}Mn_x)$ --, therefor.

In Column 6, Lines 59-60, in Claim 3, delete "Eu2+ (BAM);" and insert -- $Eu^{2+}$ (BAM) --, therefor.

In Column 6, Line 61, in Claim 3, delete "group ranges" and insert -- group of ranges --, therefor.

Signed and Sealed this
Twenty-first Day of July, 2015

Michelle K. Lee
*Director of the United States Patent and Trademark Office*

United States Patent
Cohen et al.

(12)

(10) Patent No.: US 8,987,984 B2
(45) Date of Patent: Mar. 24, 2015

(54) FLUORESCENT LAMP INCLUDING PHOSPHOR COMPOSITION WITH SPECIAL BAMN PHOSPHOR, (BA,SR,CA)(MG1-X MNX)AL10O17:EU2+

(71) Applicant: General Electric Company, Schenectady, NY (US)

(72) Inventors: William Erwin Cohen, Cleveland, OH (US); Fangming Du, Northfield, OH (US); William Beers, Cleveland, OH (US); Jon Bennett Jansma, Cleveland, OH (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 13/655,894

(22) Filed: Oct. 19, 2012

(65) Prior Publication Data
US 2014/0111082 A1    Apr. 24, 2014

(51) Int. Cl.
*H01J 9/00*     (2006.01)
*H01J 1/62*     (2006.01)
*C09K 11/76*    (2006.01)

(52) U.S. Cl.
CPC .................................. *C09K 11/76* (2013.01)
USPC ................... 313/487; 313/503; 252/301.4 R; 252/301.4 S; 252/301.6 P; 252/301.4 P

(58) Field of Classification Search
CPC ........................ C09K 11/76; C09K 11/7734
USPC ............. 313/487, 503; 252/301.4 S, 301.4 P, 252/301.6 P, 301.4 R
See application file for complete search history.

(56) References Cited

U.S. PATENT DOCUMENTS

| 2,279,635 A | 4/1942 | Morley |
| 3,764,844 A | 10/1973 | Schmidt |
| 3,899,712 A | 8/1975 | Witting |

(Continued)

FOREIGN PATENT DOCUMENTS

| DE | 4133077 | 4/1993 |
| GB | 2405409 | 3/2005 |

(Continued)

OTHER PUBLICATIONS

International Commission on Illumination, Method of Measuring and Specifying Colour Rendering Properties of Light Sources, 2nd Edition, Publication CIE No. 13.2 (TC-3.2), 1974, France.

(Continued)

*Primary Examiner* — Elmito Breval
(74) *Attorney, Agent, or Firm* — Pearne & Gordon LLP

(57) ABSTRACT

A fluorescent lamp includes a phosphor composition comprising: $Y_2O_3:Eu^{3+}$ (YEO); at least one of $LaPO_4:Ce^{3+}, Tb^{3+}$ (LAP), $MgAl_{11}O_{19}:Ce^{3+}, Tb^{3+}$ (CAT) or $GdMgB_5O_{10}:Ce^{3+}, Tb^{3+}$ (CBT); a special BAMn phosphor, $(Ba,Sr,Ca)(Mg_{1-x}Mn_x)Al_{10}O_{17}:Eu^{2+}$, with a specific amount of Mn (x) as disclosed herein, and optionally halophosphor, with the proviso that there is no $BaMgAl_{10}O_{17}:Eu^{2+}$ (BAM).

13 Claims, 1 Drawing Sheet